Nov. 3, 1931. H. A. WRIGHT 1,829,776
OUTLET BOX
Filed March 11, 1929 2 Sheets-Sheet 2

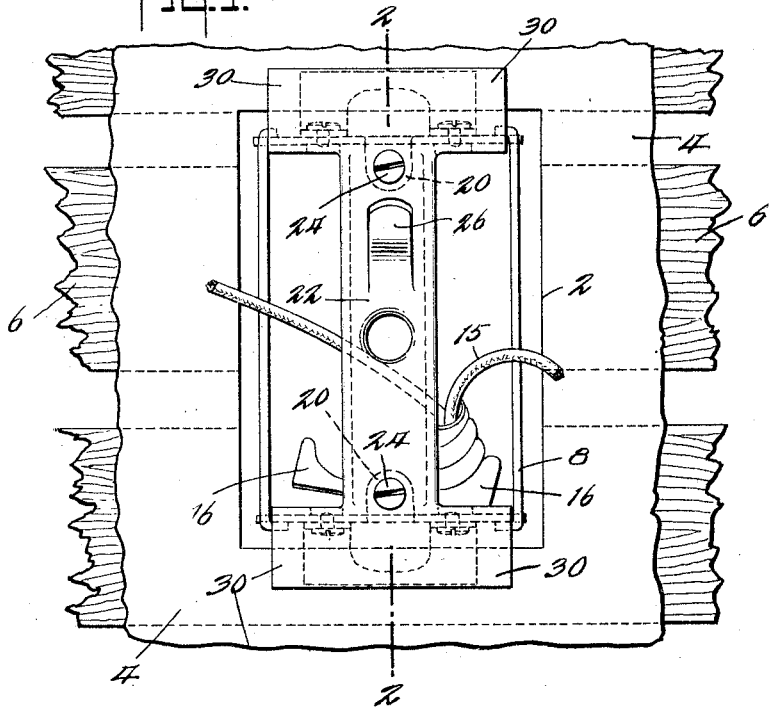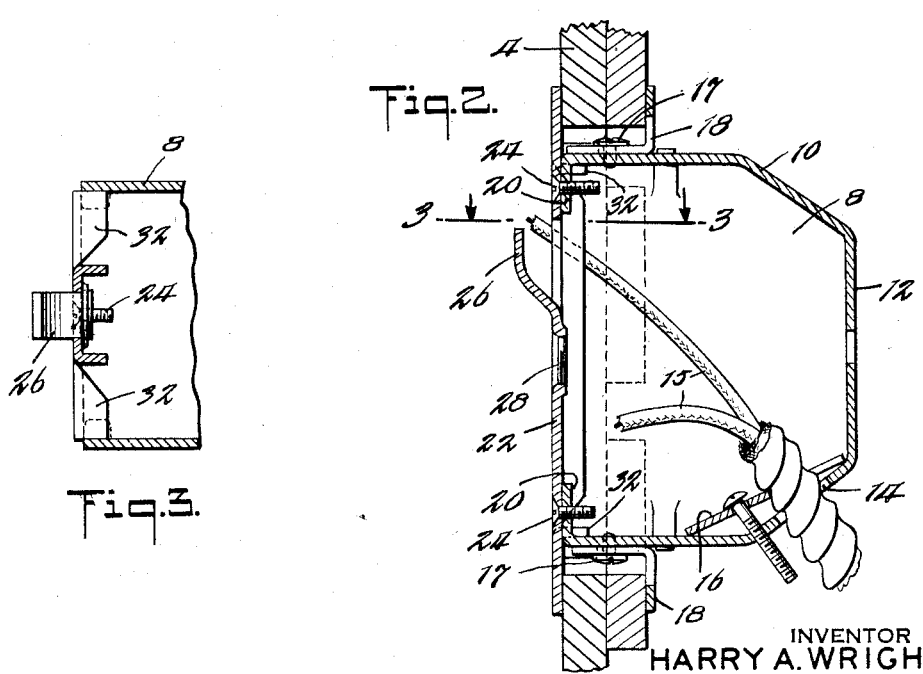

INVENTOR
HARRY A. WRIGHT
BY
ATTORNEYS

Patented Nov. 3, 1931

1,829,776

UNITED STATES PATENT OFFICE

HARRY A. WRIGHT, OF SPRINGFIELD, MASSACHUSETTS

OUTLET BOX

Application filed March 11, 1929. Serial No. 345,931.

My invention relates to outlet boxes for lighting fixtures, switches, connecting plugs and similar devices.

One of the objects of my invention is to provide an outlet box of this character which is of simple and strong construction, may be quickly and easily installed and when installed is securely and rigidly held.

Another of the objects of my invention is to provide an outlet box of this character which is particularly adapted for use in the wiring of old buildings, the outlet boxes at present in general commercial use being unsatisfactory for this purpose especially.

These and other objects of the invention and features whereby they may be attained will be clearly understood by those skilled in the art from the following description and accompanying drawings, in which:

Figure 1 is a front view of an outlet box embodying features of my invention in their preferred form, shown applied to a portion of a plaster wall or ceiling;

Figs. 2 and 3 are sectional views, taken on the lines 2—2 and 3—3 of Fig. 1 and Fig. 2, respectively.

Figure 4:
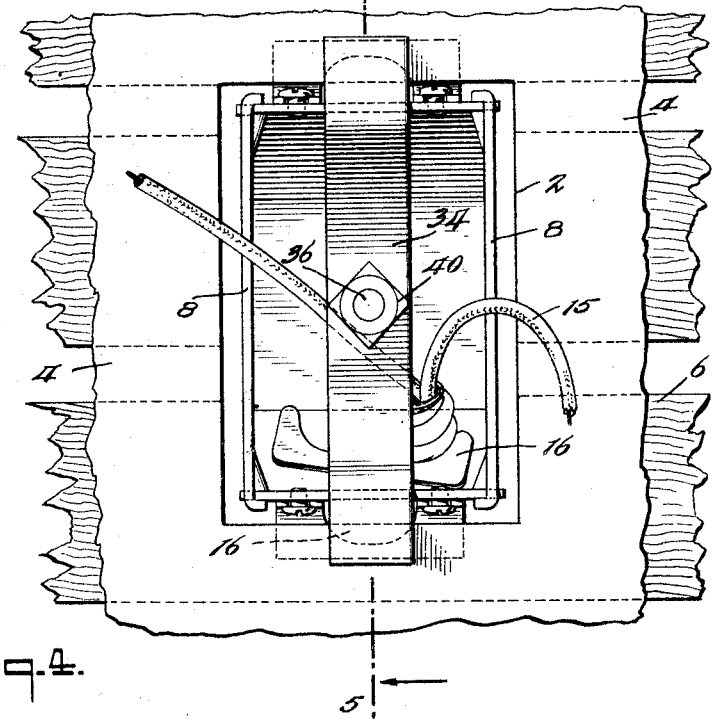
Figure 5:
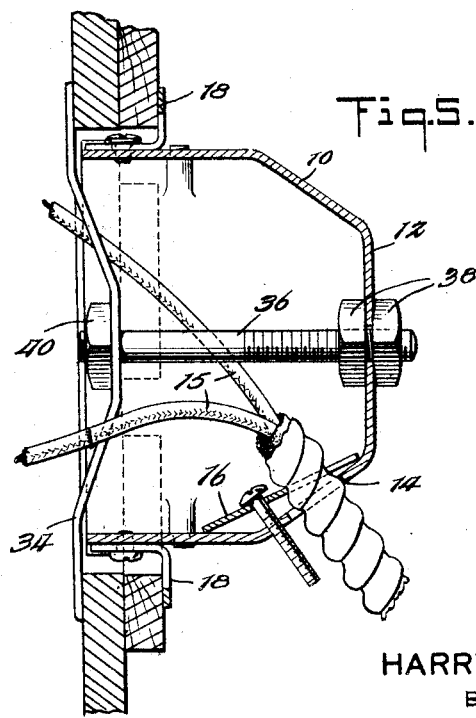

Fig. 4 is a view corresponding to Fig. 1 but showing a modified construction; and Fig. 5 is a sectional view taken on the line 5—5 of Fig. 4.

My improved outlet box is illustrated in the drawings as secured in an opening 2 that is cut in a plaster wall or ceiling, the plaster being shown at 4 and the laths at 6. As shown, the box is provided with the usual side walls 8, end walls 10 and rear wall 12, the front or face of the box being open. The box is further provided with one or more openings 14 through which the usual encased wires 15 may be secured to the box by means of a suitable clamp 16. Preferably the box is of greater height than depth.

In the illustrated construction, angle irons are secured by screws 17 to the ends of the box so as to provide outwardly projecting flanges 18 that are spaced a distance rearwardly from the face of the box, the screws extending through slots to provide for adjustment of the flanges with relation to the front of the box. The ends of the box are provided with inwardly turned ears 20 that are arranged in the plane of the outer edge of the face of the box. In the construction shown in Figs. 1, 2 and 3 of the drawings, a bar 22 is secured over the face of the box by means of screws 24 which extend through apertures in the bar and are screw-threaded into the ears 20. This bar may be provided with a struckup U-shaped hook 26 and a threaded aperture 28 for use in securing a lighting fixture thereto if desired. The bar 22 is made of sheet metal and has projecting ends 30 of a width corresponding to the distance between the sides of the box, and the portion of the bar between said ends is reduced in width so as to provide substantial spaces between its edges and the sides of the box. The inner edges of the ends of the bar have inwardly turned projections 32 so that when the bar is positioned on the box these projections engage the inner sides of the end walls and their outer edges engage the side walls of the box. Thus these projections insure proper positioning of the bar on the box and help retain the bar in position while the screws 24 are being inserted.

To insert my improved outlet box in the wall opening 2 which is slightly larger in dimension than the box, the wires 15 to be connected to the electric fixture or other device are first pulled up through the opening in the wall and then inserted through the hole or holes 14 provided in the back of the box. While holding the wires, the box is turned more or less face downward and inserted endwise through the opening in the wall, and then the box is turned into upright position and drawn forward through the hole so as to position the flanges 18 against the back of the wall, these flanges being so adjusted that when they engage the back of the wall the front edge or face of the box is positioned substantially in the plane of the front side of the wall. While the box is thus positioned, the clamp 16 may be tightened so as to clamp the wires to the box, and then the bar 22 is secured over the front face of the box as above described. When the bar is thus secured the projecting ends 30 thereof are arranged opposite to the flanges 18, and thus as the screws 24 are tightened the projecting ends and flanges are caused to tightly engage the wall and to securely hold the box in place.

From the foregoing it will be apparent that my improved outlet box is particularly adapted for use in wiring old buildings, may be easily and quickly installed in a suitable opening cut in the wall or ceiling and when installed is securely and rigidly held, although obviously it may be used to advantage in wiring new buildings or buildings under construction.

In the embodiment shown in Figs. 4 and 5 of the drawings, a bar 34 is employed in place of the bar 22. This bar 34, like the bar 22, has projecting ends which when the outlet box is installed engage the front side of the wall opposite to the flanges 18 so as to securely hold the box in place. The bar 34, however, is secured by means of a rod or bolt 36 which extends through an aperture in the rear wall of the box and, as shown, is held by nuts 38 screwed thereon against opposite sides of the back of the box. The forward end of the bolt 36 extends through a central aperture in the bar 34, and when the bar has been positioned, a clamping nut 40 is screwed on the end of the bolt and tightened so as to cause the ends of the bar and the flanges 18 to firmly grip or clamp the wall between them. As shown, the bar 34 is centrally depressed so that the nut 40 need not project out beyond the front of the wall. If desired the bar 22 may likewise be centrally depressed.

As will be evident to those skilled in the art, my invention permits various modifications without departing from the spirit thereof or the scope of the appended claims.

What I claim is:

1. The combination of an outlet box for insertion into an opening in a wall, outwardly projecting flanges secured to the ends of the box for engagement with the back of the wall when the box is in place, and a bar adapted to be secured over the face of the box when in place having projecting ends for engagement with the front side of the wall, and means arranged within the periphery of the front of the body of the box for detachably securing said bar to said box.

2. The combination of an outlet box of greater height than depth so as to permit it to be passed end foremost through an opening in the wall and then brought forward so as to position its open face substantially flush with the front of the wall, flanges secured on the ends of said box and arranged so as to engage the back of the wall when the box is thus positioned, a bar adapted to be secured over the face of the box when thus positioned having projecting ends for engaging the front of the wall opposite to said flanges, and means arranged within the periphery of the front of the body of the box for thus securing the bar.

3. The combination of an outlet box having a rectangular open face and a bar adapted to be secured over said face with its ends projecting beyond the ends of the box, and means arranged within the periphery of the front of the body of the box for securing the bar to the box.

4. The combination of an outlet box having a rectangular open face, a bar adapted to be secured over said face with its ends projecting beyond the ends of the box, and means for securing the bar to the box, said bar having inward projections adjacent the ends and the sides of the box so as to assist in proper positioning of the bar on the box.

5. The combination of an outlet box having a rectangular open face and having inwardly turned ears on the edges of its end walls, a bar adapted to be positioned over the face of the box and having projecting ends of substantially the width of the space between the side walls of the box with the portion of the bar between said ends reduced in width, said ends having inwardly turned portions engaging the inner sides of the end walls of the box with their outer edges arranged adjacent the side walls of the box, and screws extending through apertures in the bar and screw-threaded into said ears for securing the bar to the box.

6. The combination of an outlet box, flanges secured on the ends of said box, said box being of greater height than depth so as to permit it to be passed end-foremost through an opening in a wall of slightly greater area than the area of the front face of the box and then brought forward so as to position its front face substantially flush with the front of the wall and to position its flanges in engagement with the back of the wall, a bar adapted to be centrally secured over the face of the box when thus positioned having projecting ends for engaging the front of the wall opposite to said flanges, and means arranged within the periphery of the front of the body of the box for thus securing the bar so as to cause said projecting ends of the bar and said flanges to tightly clamp the adjacent portions of the wall between them.

In testimony whereof, I have signed my name to this specification this first day of March, 1929.

HARRY A. WRIGHT.